United States Patent
Belser

(10) Patent No.: US 6,751,035 B1
(45) Date of Patent: Jun. 15, 2004

(54) METHOD AND SYSTEM FOR INITIALIZING PATTERNED MEDIA

(75) Inventor: Karl A. Belser, San Jose, CA (US)

(73) Assignee: Seagate Technology LLC, Scotts Valley, CA (US)

( * ) Notice: Subject to any disclaimer, the term of this patent is extended or adjusted under 35 U.S.C. 154(b) by 542 days.

(21) Appl. No.: 09/863,394

(22) Filed: May 23, 2001

Related U.S. Application Data

(63) Continuation-in-part of application No. 09/591,596, filed on Jun. 8, 2000.
(60) Provisional application No. 60/206,747, filed on May 24, 2000, provisional application No. 60/150,123, filed on Aug. 20, 1999, provisional application No. 60/150,122, filed on Aug. 20, 1999, provisional application No. 60/143,482, filed on Jul. 12, 1999, provisional application No. 60/138,258, filed on Jun. 8, 1999, provisional application No. 60/138,257, filed on Jun. 8, 1999, provisional application No. 60/138,256, filed on Jun. 8, 1999, and provisional application No. 60/138,255, filed on Jun. 8, 1999.

(51) Int. Cl.⁷ .............................. G11B 5/09; G11B 5/596
(52) U.S. Cl. ............................ 360/48; 360/50; 360/53; 360/77.08
(58) Field of Search .............................. 360/48, 50, 53, 360/77.05, 77.08, 78.04, 51

(56) References Cited

U.S. PATENT DOCUMENTS 5,165,082 A * 11/1992 Tomiyama ............... 360/77.02
5,987,634 A * 11/1999 Behrens et al. ............. 714/719
6,154,330 A * 11/2000 Nakagawa ................... 360/48
6,476,992 B1 * 11/2002 Shimatani .................... 360/46
6,510,015 B2 * 1/2003 Sacks et al. .................. 360/75
6,643,082 B1 * 11/2003 Belser ......................... 360/48

* cited by examiner

Primary Examiner—David Hudspeth
Assistant Examiner—Jason Olson
(74) Attorney, Agent, or Firm—Raghunath S. Minisandram; Jesus Del Castillo

(57) ABSTRACT

A patterned media having recordable and non-recordable regions is initialized by first erasing (e.g. DC magnetizing) at least a portion of the recordable regions. At least one offset may then be determined. The at least one offset may compensate for a read to write delay in the electronics and/or at least one delay caused by the space separation between a read and a write head. A plurality of position error signal (PES) bursts may then be written on at least a portion of the recordable regions. During the write process, the previously written PES bursts are read and used to determine PES signals (e.g. servo signals) in order to guide the write head while writing new PES bursts. Magnetically written gray code may then be written on the media. The magnetically written gray code may be used to define a track number for the data tracks with no eccentricity.

21 Claims, 16 Drawing Sheets

METHOD AND SYSTEM FOR INITIALIZING PATTERNED MEDIA

CROSS REFERENCE TO RELATED APPLICATIONS

This patent application is a continuation-in-part of commonly assigned U.S. patent application Ser. No. 09/591,546, filed Jun. 8, 2000, which claims the benefit of U.S. Provisional Application No. 60/138,258 filed Jun. 8, 1999, U.S. Provisional Application No. 60/138,255 filed on Jun. 8, 1999, U.S. Provisional Application No. 60/138,257 filed on Jun. 8, 1999, U.S. Provisional Application No. 60/138,256 filed on Jun. 8, 1999, U.S. Provisional Application No. 60/143,482 filed on Jul. 12, 1999, U.S. Provisional Application No. 60/150,122 filed on Aug. 20, 1999, and U.S. Provisional Application No. 60/150,123 filed on Aug. 20, 1999. The subject matter of these related applications are incorporated herein by reference.

This application is related to and claims the benefit of commonly assigned U.S. Provisional Application No. 60/206,747, filed on May 24, 2000. The subject matter of this related application is incorporated herein by reference.

BACKGROUND

1. Field of the Invention

This invention relates to magnetic recording media, such as the recording media used in hard disk drives, and in particular to patterned recording media. Still more particularly, the present invention relates to a method and system for initializing patterned media.

2. Description of the Prior Art

Designers, manufacturers, and users of computing systems require reliable and efficient digital information storage and retrieval equipment. Conventional magnetic disk drive systems are typically used and are well known in the art. As the amount of information that is stored digitally increases, however, users of magnetic recording media need to be able to store larger and larger amounts of data. To meet this demand, designers of magnetic recording media are working to reduce the size of the features on a recording disk, because the storage capacity of a recording disk is a function of the number of closely spaced concentric tracks on the disk. Some of the recording disk surface area, however, must be used for purposes other than data storage.

Some systems use various types of indexing marks and alignment indicia to help keep the read and write head(s) properly aligned on a particular track. These marks and indicia are often recorded in servo sectors, which are angularly spaced reserved portions of the recording disk surface that extend out approximately radially from the disk centers. Track addresses and angular synchronization signals that determine the circumferential location of the magnetic head can also be recorded in servo sectors. Position error signal (PES) bursts are often recorded in servo sectors for generation of position error signals that are used to keep the read and write head(s) aligned. Servo sectors use recording disk surface area that could otherwise be used for data storage. Consequently, servo sector information must be stored as efficiently as possible in order to leave as much space as possible for data storage.

Additionally, as the demand to store more data on each disk increases, designers are increasing the number of tracks on each disk. However, with track densities at and exceeding ten thousand tracks per inch, the tasks of increasing data storage capacity and writing servo patterns with suitable geometric accuracy are becoming increasingly difficult. Therefore, developing new techniques for manufacturing and using magnetic recording media remain significant considerations for designers, manufacturers, and users of contemporary electronic devices.

SUMMARY

In accordance with the present invention, a method and system are disclosed for initializing patterned media. The process begins by DC initializing (i.e. erasing) at least a portion of the recordable regions on the patterned media. At least one offset may then be determined. The at least one offset compensates for at least one delay. For example, the at least one offset may compensate for delays in the electronics, one example being a read to write delay. Furthermore, the at least one offset may compensate for at least one delay caused by the space separation between at least one write head and at least one read head.

In certain embodiments, the at least one offset may be determined by writing at least one test mark on at least a portion of the initialized recordable regions. Position and/or timing information is recorded when the at least one test mark is written, when the test mark is first detected by a read head, and when the test mark is last detected by the read head. This information may then be used to determine at least one offset, such as a radial and a circumferential offset.

After the at least one offset is determined, a plurality of position error signal (PES) bursts may be written on at least a portion of the initialized recordable regions. The previously written PES bursts may be used to determine PES signals for guiding the at least one write head as new PES burst fields are written. When all of the desired PES bursts have been written, a gray code may be written on at least a portion of the recordable regions. The gray code may be used to define a track number for the data tracks with no eccentricity. In certain embodiments, the gray code may be written as two sets of gray code in order to compensate for side erasure gaps in the first set of gray code.

A system for initializing pattern media may include a null mark detector, a servo timing mark (STM) and interval detector, a PES detector, and a pattern generator with a delay. The null mark detector may be used to detect transitions in a null-type PES pattern while the PES detector may be used to detect PES bursts. The servo timing mark (STM) and interval detector may be used to determine the at least one offset. The pattern generator with delay may be used to generate a data pattern for the written data, such as the gray code. The delay circuit may be used to determine when a write head is positioned over the proper location on the media before data is written to the media.

The null mark detector, servo timing mark (STM) and interval detector, PES detector, and pattern generator with delay may be configured and implemented in any desired manner. For example, in certain embodiments, the null mark detector, servo timing mark (STM) and interval detector, and PES detector may be implemented as hard wired logic within the system.

BRIEF DESCRIPTION OF THE DRAWINGS

The novel features believed characteristic of the invention are set forth in the appended claims. The invention itself, however, as well as a preferred mode of use, and further objects and advantages thereof, will best be understood by reference to the following detailed description of an illustrative embodiment when read in conjunction with the accompanying drawings, wherein:

DETAILED DESCRIPTION

To facilitate an understanding of the present invention, it is described hereinafter in the context of a specific embodiment. In particular, reference is made to the implementation of the invention in a patterned magnetic hard disk media for a hard disk drive. It will be appreciated, however, that the practical applications of the invention are not limited to this particular embodiment. Rather, the invention can be employed in other types of magnetic recording media, one example being magneto-optical hard disk media.

Figure 1:
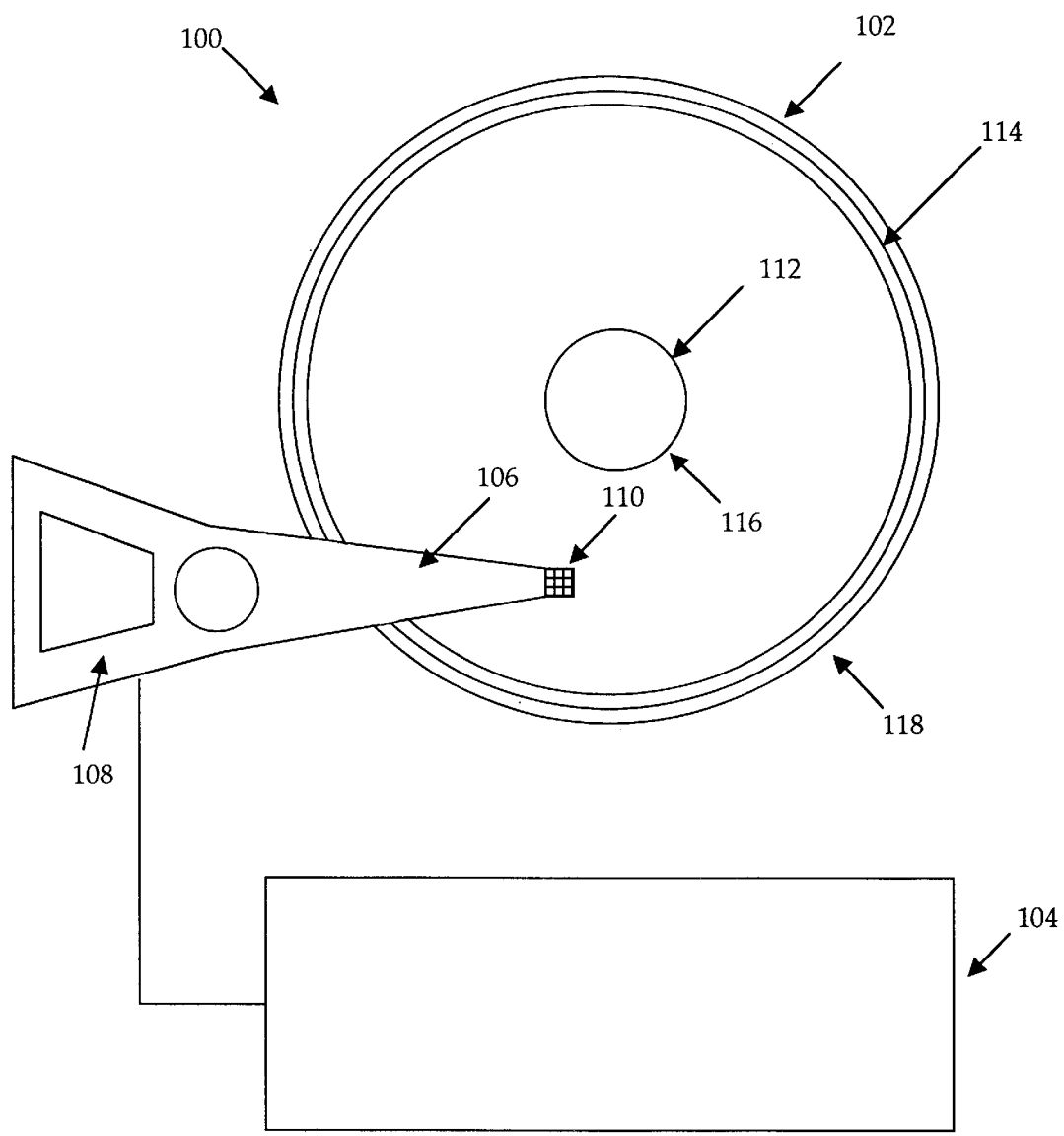
FIG. 1 is a diagram of a data storage system that may be used with the present invention.

With reference now to the figures and in particular with reference to FIG. 1, a data storage system that can be used with the present invention is shown. Data storage system 100 in this exemplary embodiment is a hard disk drive system. Data storage system 100 includes one or more storage disks 102, a storage system controller 104, an actuator 106, a voice coil motor 108, a recording head 110, and a rotating spindle 112. The recording head 110 is comprised of at least one read head and at least one write head, and is positioned at the end of actuator 106. Actuator 106 is moved via voice coil motor 108. The recording head 110 transfers data between storage system controller 104 and a specific physical location on storage disk 102. Data is preferably stored in many approximately consecutively numbered concentric rings or "tracks" 114 on storage disk 102. For clarity, only two tracks 114 are shown in FIG. 1. The tracks are displaced radially from each other, beginning at the inner diameter 116 of the disk 102 and continuing to the outer diameter 118 of the disk 102.

Storage system controller 104 may randomly access a specific logical location on storage disk 102 via a particular track address and a particular sector address. Tracks 114 are very closely spaced in order to maximize storage capacity and economy. The mechanical precision of the movement of storage disk 102 and the movement of recording head 110 is critical to accessing the proper data storage location on storage disk 102. Storage system controller 104 thus requires some means for precisely positioning recording head 110 quickly and accurately over tracks 114 for subsequent storage and retrieval operations.

Figure 2:
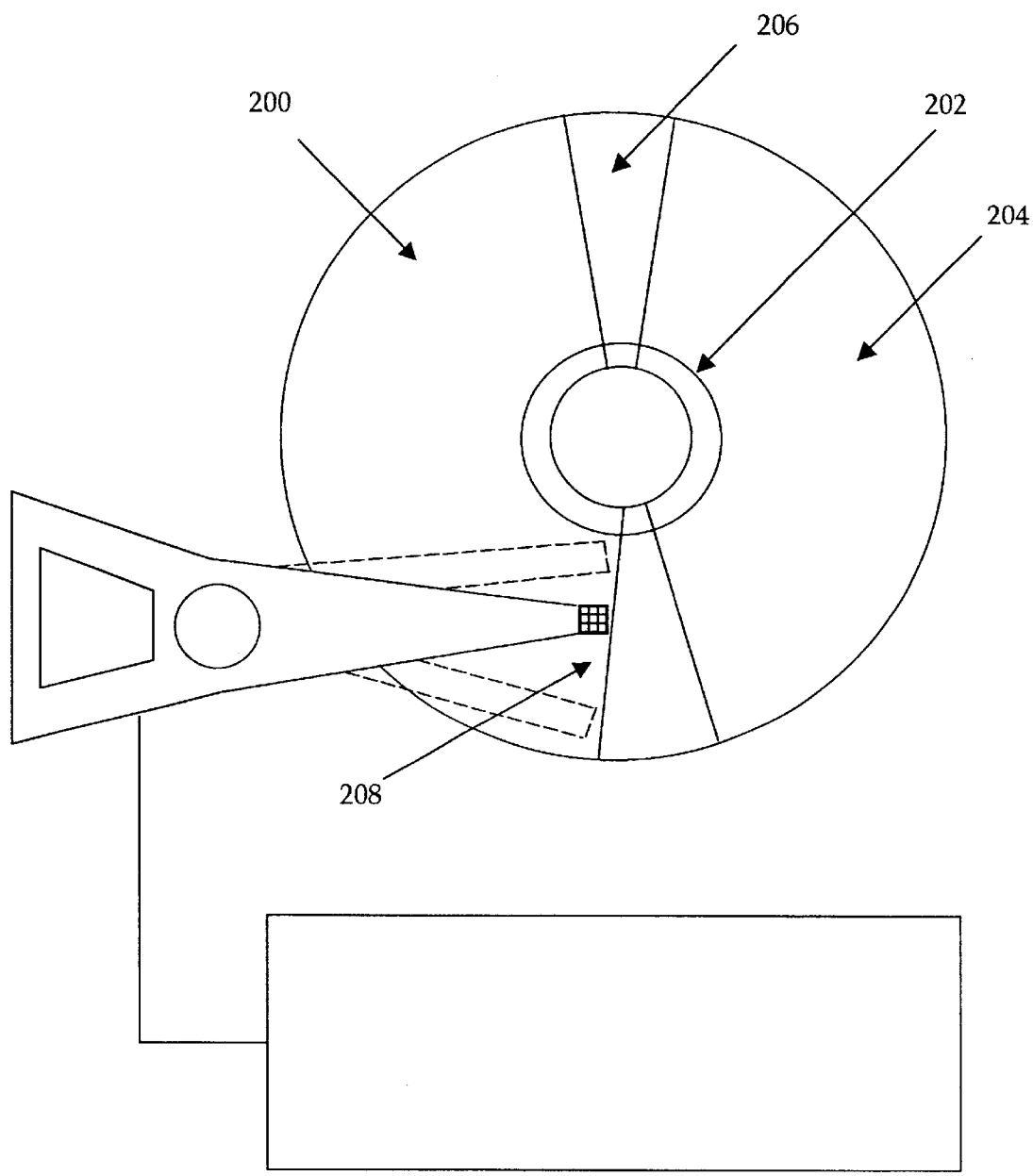
FIG. 2 is a diagram depicting an upper surface of a recording disk utilized in the disk drive assembly of FIG. 1.
Figure 3:
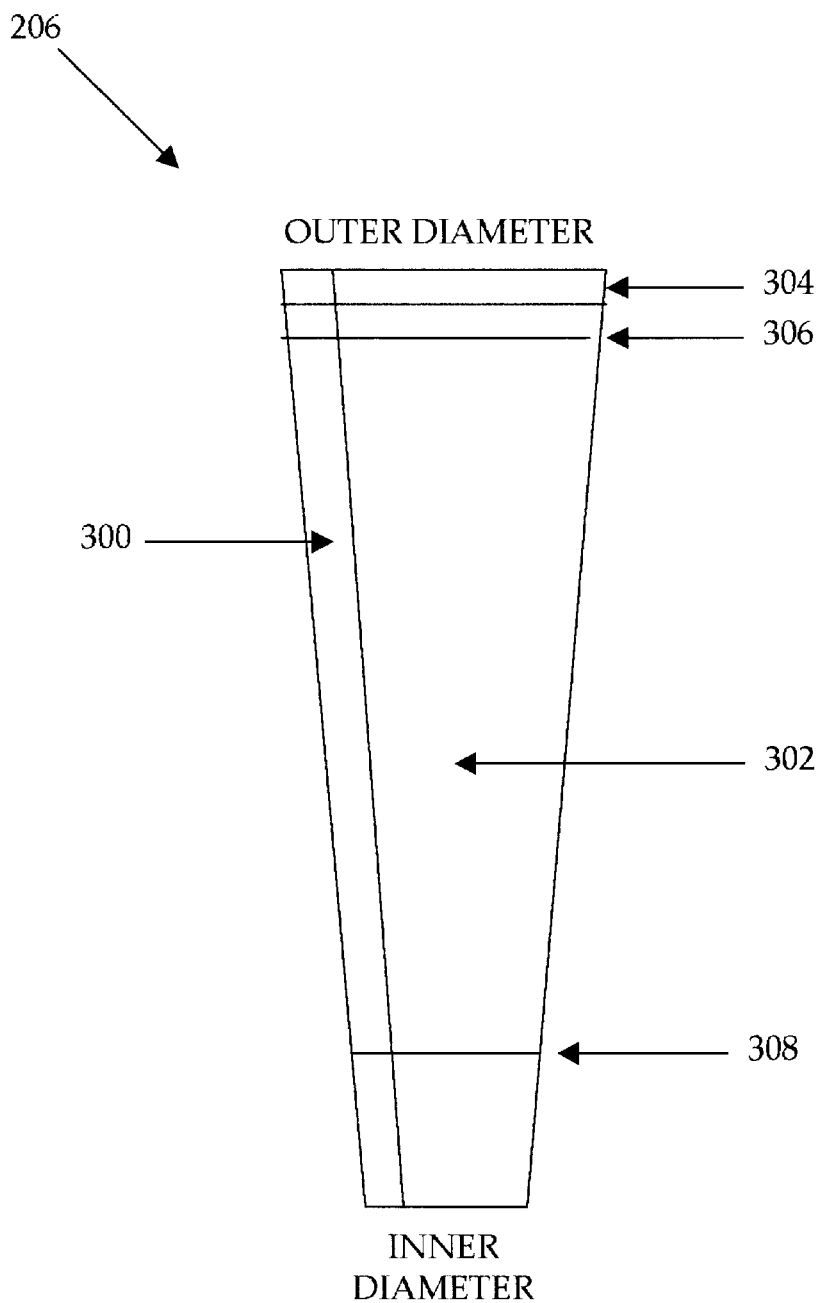
FIG. 3 is a linearized diagram of one embodiment of a sector of the recording disk illustrated in FIG. 2.

Referring now to FIG. 2, a diagram of a surface of an exemplary storage disk is illustrated. The surface 200 of storage disk 102 typically includes a landing zone 202, a useable data zone 204, arc-shaped sectors 206, and an arcshaped path 208 taken across the surface 200 by recording head 110. A linearized diagram of an exemplary sector 206 is shown in FIG. 3. Sector 206 includes a servo sector 300, a data wedge 302, a pair of neighboring numbered concentric tracks 304 and 306, and a border 308 between landing zone 202 and useable data zone 204. Data wedge 302 includes stored user data, while servo sector 300 includes address and alignment information (e.g. servo marks) used by the disk drive system.

Figure 4:
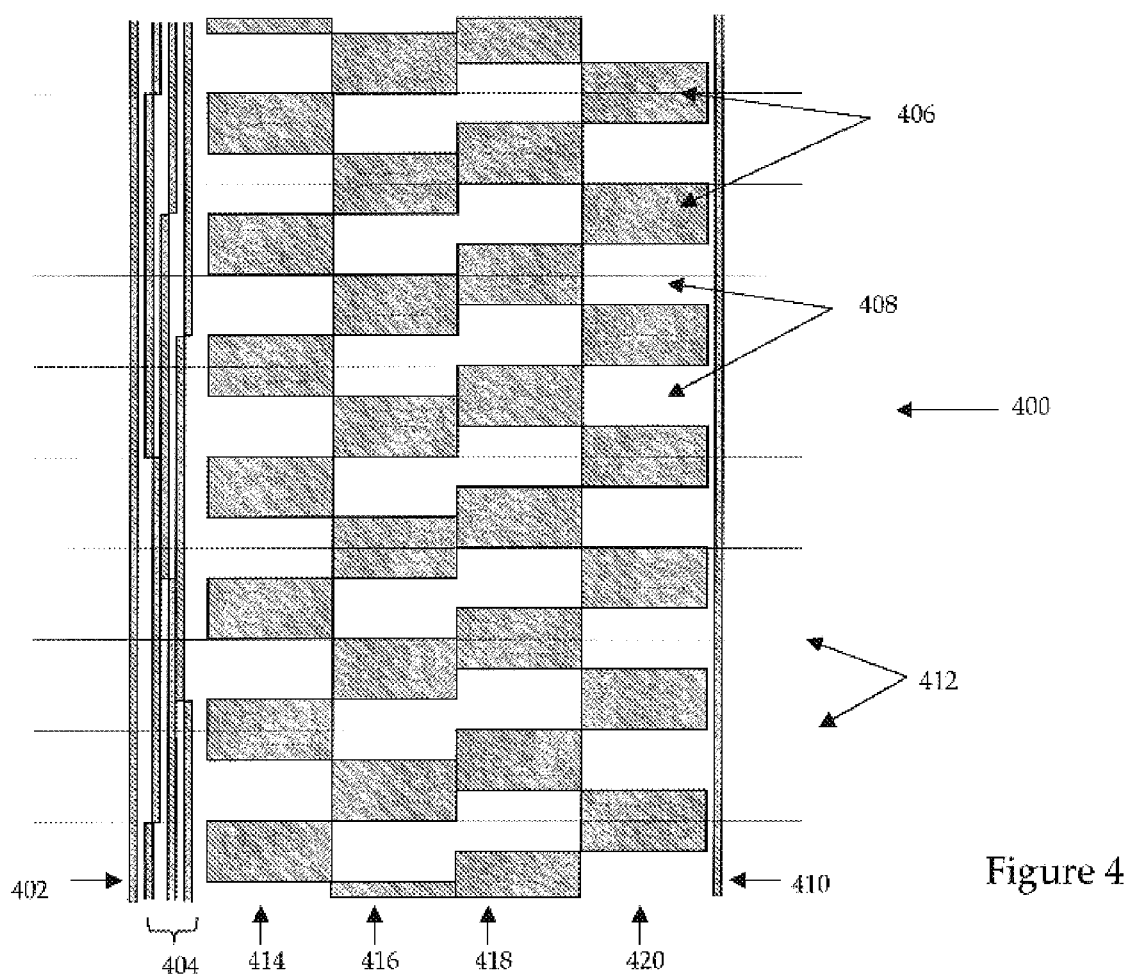
FIG. 4 is a diagram illustrating an exemplary servo sector format for a patterned media according to the present invention.

FIG. 4 is a diagram illustrating an exemplary servo sector format for a patterned media according to the present invention. The servo sector format 400 is comprised of a first patterned servo timing mark 402, a patterned gray code 404, a plurality of PES burst separators 406, a plurality of PES bursts fields 408, and a second patterned servo timing mark 410. To assist in understanding the invention, the horizontal lines 412 shown in FIG. 4 depict the center of the tracks.

The patterned servo sector format 400 may be implemented and configured in any desired manner. For example, the servo sector format 400 may be implemented with rectangular patterns or shapes. The present invention, however, is not limited to this shape. Other patterns or shapes may be used with the present invention.

The servo sector format pattern 400 is used to pattern the surface of a magnetic recording disk. In other words, servo sector format pattern 400 is used to create a combination of recordable regions and non-recordable regions in or on the surface of the recording disk. In this exemplary embodiment, the first patterned servo timing mark 402, the patterned gray code 404, the plurality of PES burst separators 406, and the second servo timing mark 410 are non-recordable regions, while the plurality of PES burst fields 408 and the data wedge 302 are recordable regions.

Recordable and non-recordable regions may be implemented and configured in any desired manner. For example, servo sector format pattern 400 may be created with a combination of raised features and/or depressed features in or on the surface of the recording disk. One technique that may be used to create raised and/or depressed features is to etch the recording layer. Another technique that may be used to created raised and/or depressed features is to etch the substrate and then deposit one or more layers, including at least one recording layer, over the surface of the etched substrate. Alternatively, recordable and non-recordable regions may be created by implanting ions into particular areas in at least one recording layer in order to raise or lower the coercivity, thereby creating recordable or non-recordable regions in the layer or layers.

Furthermore, the patterned gray code 404 and PES burst separators 406 may be patterned with diagonally adjacent corners. Patterning with diagonally adjacent corners may be implemented in any desired manner. For example, a resist can be exposed using a plurality of round circles. The resist is then developed and diagonally adjacent corners are created in the patterned gray code 404 and PES burst separators 406. The diagonally adjacent corners enhance the resolution to provide maximum signal amplitude because the sharpness of the diagonally adjacent corners is increased by their proximity. The head, which is aligned radially, can read the bits because the edges of the bits are also aligned radially.

The patterned gray code 404 may be configured in any desired manner. In this exemplary embodiment, the patterned gray code 410 may be implemented as a six-phase gray code known as a Johnson code or a Johnson counter code that repeats every six servo pattern periods as well as every eight tracks. The six-phase gray code may be used to organize the tracks into groups so binary addressing of the tracks can be used. Other configurations of patterned gray code, however, may be used with the present invention.

Furthermore, the first patterned servo timing mark 402 and the patterned gray code 404 may provide varying kinds of servo timing marks. For example, if the patterned gray code 404 is configured as a six-phase gray code, the first servo timing mark 402 and the gray code 404 provide six different kinds of servo timing marks. These six different types of servo timing marks may then be utilized to encode radial positions on the disk.

After the disk is patterned, a plurality of servo burst fields 408 are written magnetically between the plurality of PES burst separators 406. The radial edges of the plurality of PES burst separators 406 mask the fringe fields from the head, thereby reducing or eliminating any side erasure problems. The PES burst fields 408 may be configured in any desired manner. For example, the plurality of servo burst fields 408 may be written as a quad pattern comprised of an A burst 414, a B burst 416, a C burst 418, and a D burst 420. The present invention, however, is not limited to a quad pattern. Other servo burst field patterns, such as a tri-faced patterned, can be used with the present invention.

The servo burst fields 408 are used to generate position error signals (PES). Position error signals may be determined in any desired manner. For example, the position error signal may be determined by the equation PES_N= (A−B)/(C−D). If the result of that equation is less than one, then the PES_N signal is used. If the result is greater than or equal to one, the position error signal is determined by the equation PES_Q=(C−D)/(A−B). Switching between PES_N and PES_Q typically occurs when the value is one. However, calculating a position error signal is well known in the art, and other calculations for position error signals may be used with the present invention.

Figure 5:
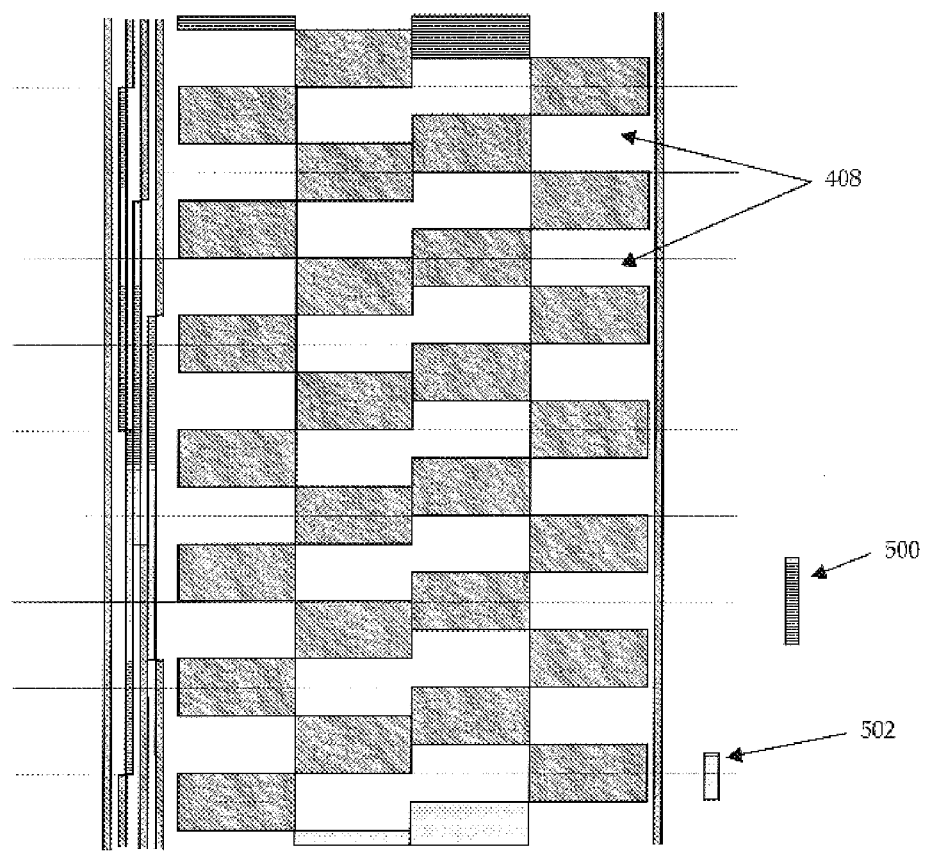
FIGS. 5–14 are diagrams depicting the exemplary servo sector format of FIG. 4 and an exemplary method for initializing patterned media according to the present invention.

FIGS. 5–14 are diagrams depicting the exemplary servo sector format of FIG. 4 and an exemplary method for initializing patterned media according to the present invention. The method for initializing patterned media may begin with direct current (DC) initialization (i.e. erasure) of the media (FIG. 5). The write head 500 and read head 502 are loaded onto the media surface at the outer diameter (OD) and then moved to the inner diameter (ID) to push against the ID crash stop.

Current may then be applied to the actuator arm motor to compress the crash stop by about one hundred micrometers while applying sufficient DC current to the write head 500 to DC magnetize and erase the media, including the PES burst fields 408. If the recordable and non-recordable regions have been created by etching one or more recording layers or by ion implantation, the media may need only one pass of the write head 500 to be erased completely.

Alternatively, if the recordable and non-recordable regions have been created by etching the substrate and then depositing one or more layers over the substrate, DC initialization of the media may require two passes of the write head 500. A high current may be utilized with the write head 500 on the first pass to DC initialize the recording layer overlying the non-etched regions of the substrate as well as the recording layer overlying the etched regions of the substrate. The current level supplied to the write head 500 may then lowered and reversed in polarity when the write head 500 passes over the media a second time. Only the recording layer overlying the non-etched regions of the substrate is recorded in the opposite polarity. The polarity of the recording layer overlying the etched regions of the substrate is not changed because the distance between the write head 500 and the recording layer overlying the etched regions is too great. The lower write current does not create a sufficient magnetic field to affect the recording layer overlying the etched regions of the substrate.

Once the media has been DC initialized, the plurality of PES burst fields 408 may be used as a null-type PES pattern. For example, transitions between a DC magnetized A burst and B burst may be used as a Null_N PES signal, and transitions between a DC magnetized C burst and D burst may be used as a Null_Q PES signal.

Figure 6:
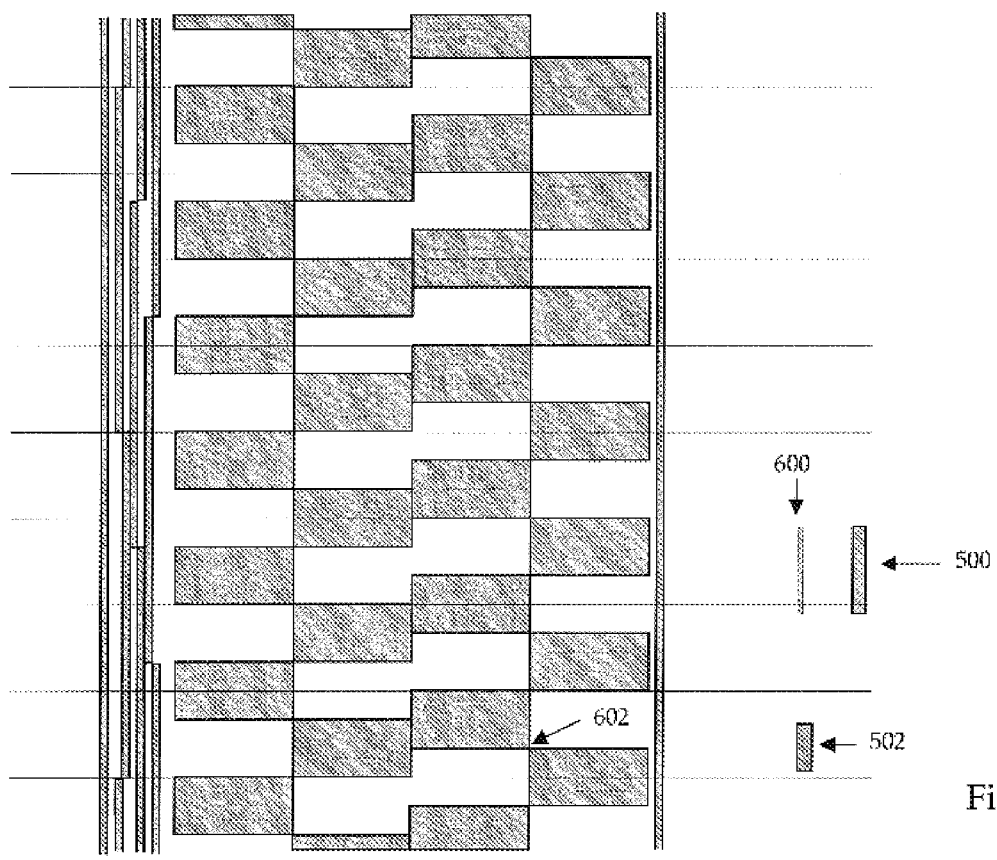
Figure 7:
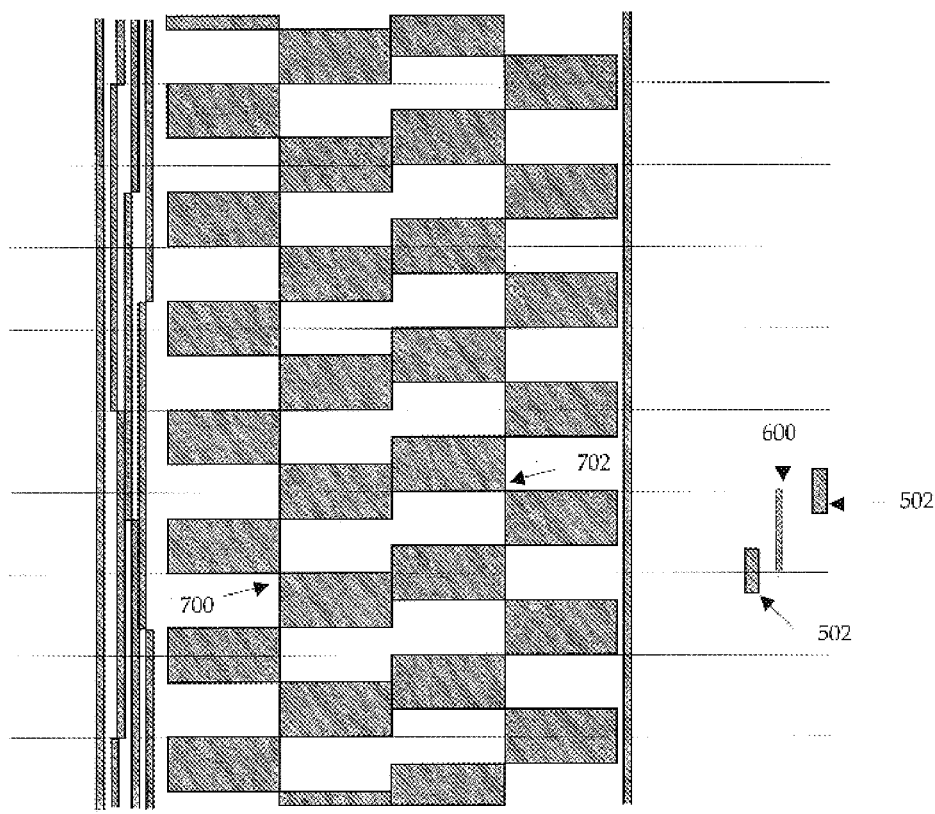

Next, at least one offset is determined (FIGS. 6–7). The offsets may be used to compensate for the read and write channel delay in the electronics and the delay caused by the space separation between the read and write heads (e.g. radial and circumferential delays). With the ID crash stop compressed, a test mark 600 of opposite polarity to the DC initialized background is written at a particular location just after the end of the second patterned servo timing mark 410. The exact radial starting position for the read head 502 may be calculated by reading the $Q_{ORIENT}$ value 602 (and/or the $N_{ORIENT}$ value or any combination thereof) and a patterned gray code value when the test mark 600 is written. As discussed above, in this exemplary embodiment, the adjacent corners of two PES burst fields 408 (A burst and B burst) form a single normal null pattern bit ($N_{ORIENT}$) when DC magnetized. The adjacent corners of two other PES burst fields (C burst and D burst) form a single quadrature null pattern bit ($Q_{ORIENT}$) when DC magnetized.

The actuator arm current is then lowered until a pulse is detected using a time interval measurement circuit. The time interval measurement circuit measures the time until the magnetic mark 600 is detected. When the test mark is first detected by the read head 502, a $N_{ORIENT}$ value 700 and a patterned gray code value are read (FIG. 7). In other words, a $N_{ORIENT}$ value 700 and a patterned gray code value are read when the ID of the test mark is detected.

A $Q_{ORIENT}$ value 702 and a third patterned gray code value are read when the test mark is last detected by the read head 502 (the OD of the test mark). This allows the radial and circumferential reader-to-writer offsets to be calculated since the center of the read head 502 is halfway between the first reading of the mark and the last reading of the mark. Additionally, the number of times the $N_{ORIENT}$ value and the $Q_{ORIENT}$ value equal zero is counted, along with a fractional value for $N_{ORIENT}$ value or the $Q_{ORIENT}$ value. This information is used to calculate the offsets.

The present invention is not limited however, to utilizing $N_{ORIENT}$ and $Q_{ORIENT}$ values and the patterned gray code. The offsets can be determined using any desired method that determines the position of the heads when a write operation and/or a read operation occurs, such as when a test mark 600 is written and read. Furthermore, more than one test mark may be written in a sector, and the one or more test marks may be written in all sectors or less than all sectors.

Figure 8:
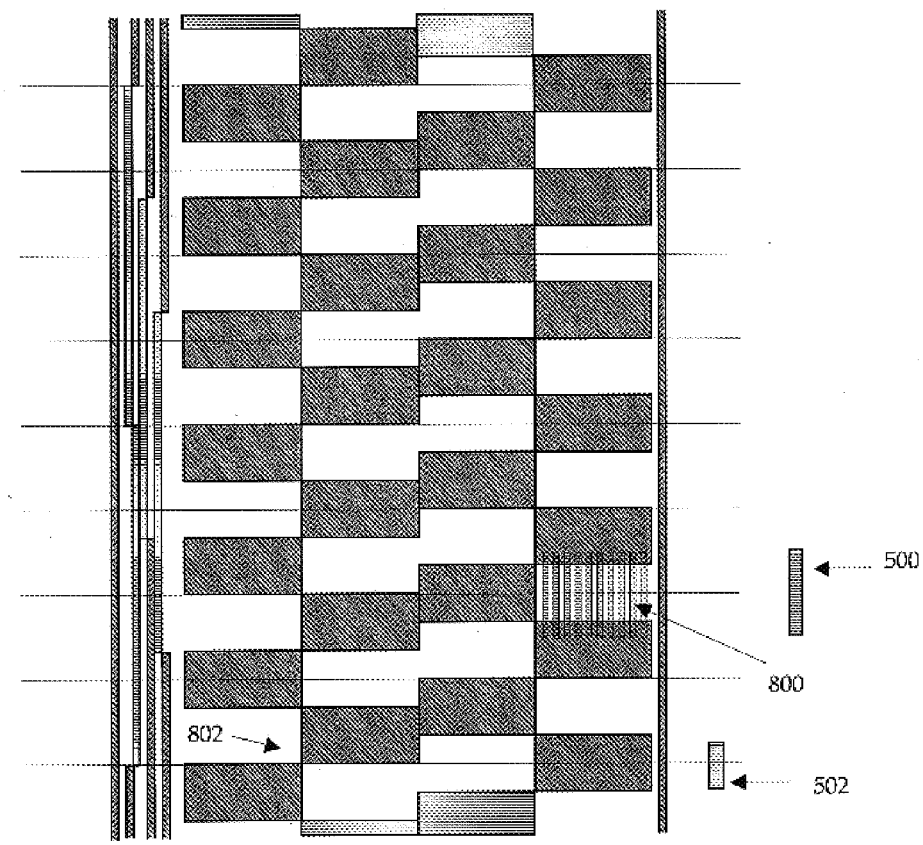
Figure 9:
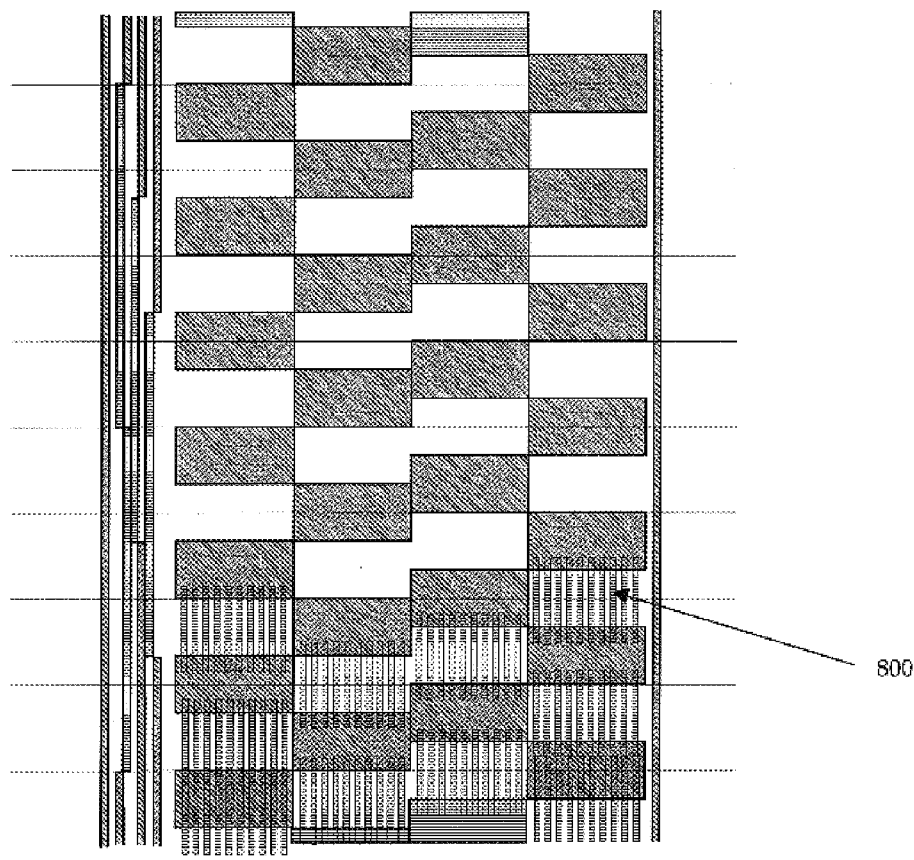

At least one orientation PES burst may now be written in the PES burst fields since the read head 502 can be positioned such that the write head 500 is positioned over a particular burst field using the offsets determined earlier. In this exemplary embodiment, the process of writing the orientation PES bursts may begin once the actuator arm current is lowered such that the crash stop is minimally depressed. PES burst 800 in FIG. 8 depicts the first orientation PES burst to be written. Writing of the orientation PES bursts continues into the ID in this exemplary embodiment (FIG. 9) because the write head is always positioned to the OD of the read head. The present invention, however, is not limited to this technique. Different configurations of read and write heads will determine the appropriate process for writing PES bursts.

Figure 10:
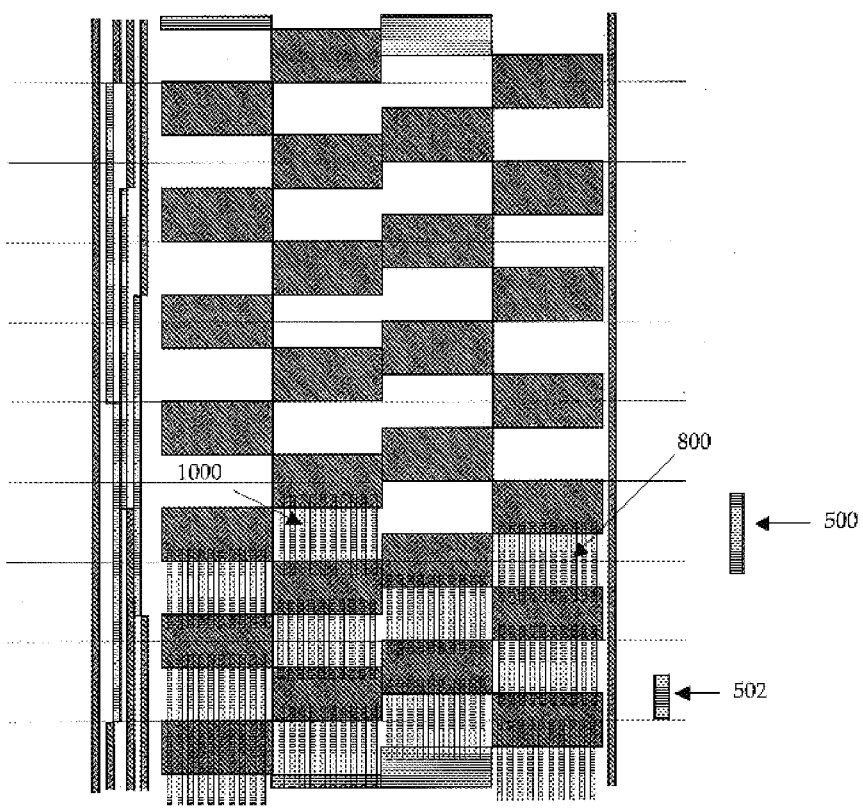
Figure 11:
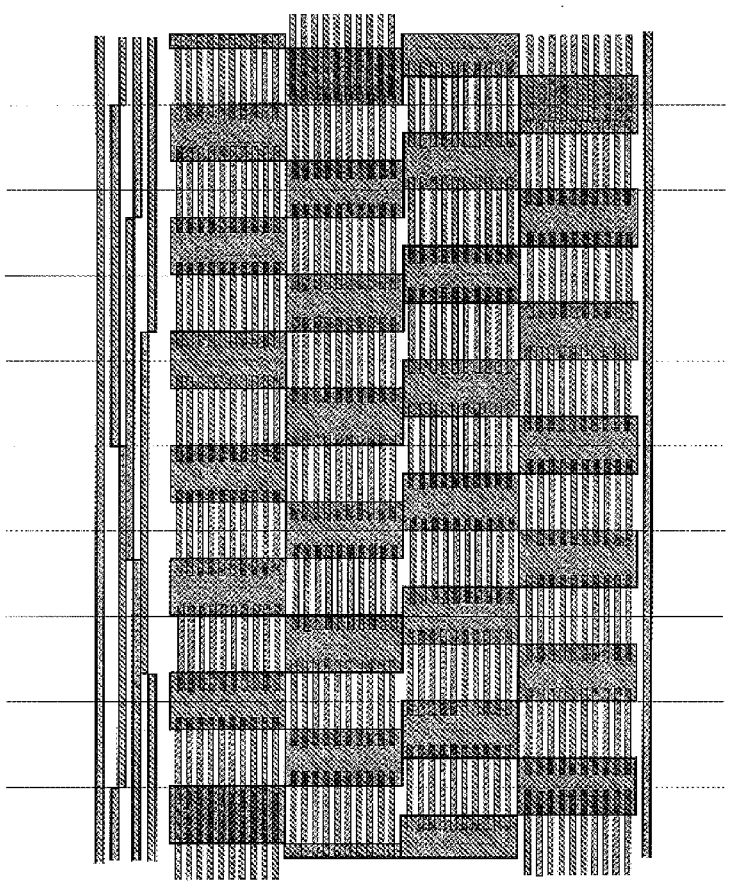

Once the orientation PES bursts are written into the ID, PES bursts may be written in the PES burst fields positioned to the OD of orientation burst 800. The PES bursts are written while utilizing the previously written PES bursts to determine PES signals. In other words, the read head can servo on the previously written PES bursts while the write head is moving to the OD of the disk and writing PES bursts. PES burst 1000 in FIG. 10 illustrates the first non-orientation PES burst to be written using the orientation PES bursts written earlier. As the write head moves to the OD of the disk, the read head will servo off orientation PES bursts initially and then off the non-orientation PES bursts. The process of writing PES bursts continues until the write head reaches the OD of the disk (FIG. 11).

As the write head passes over the data wedges the write head may be utilized to erase the media between sectors. This will erase the test marks written earlier and format the data wedges for data storage. Furthermore, at least some of the offsets, such as the radial and/or circumferential offsets, may be measured periodically and adjusted in order to account for any timing changes and actuator arc skew.

Figure 12:
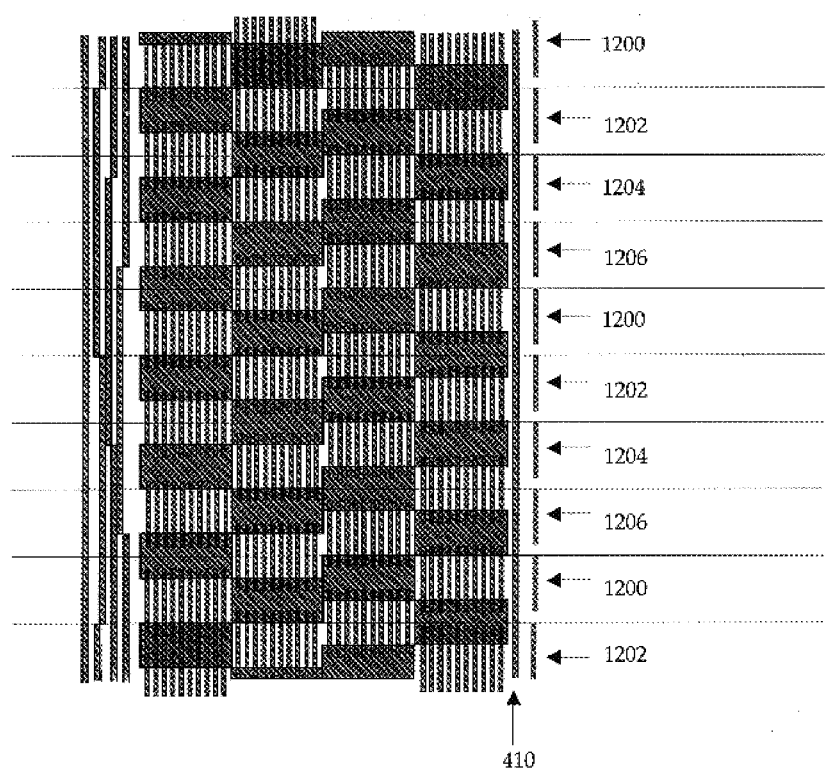
Figure 13:
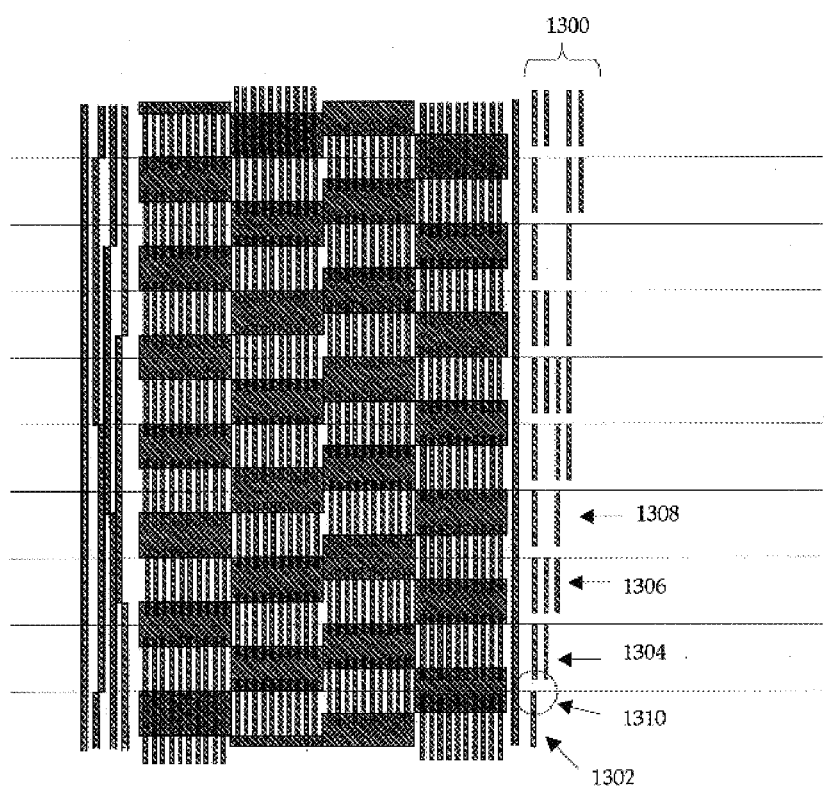
Figure 14:
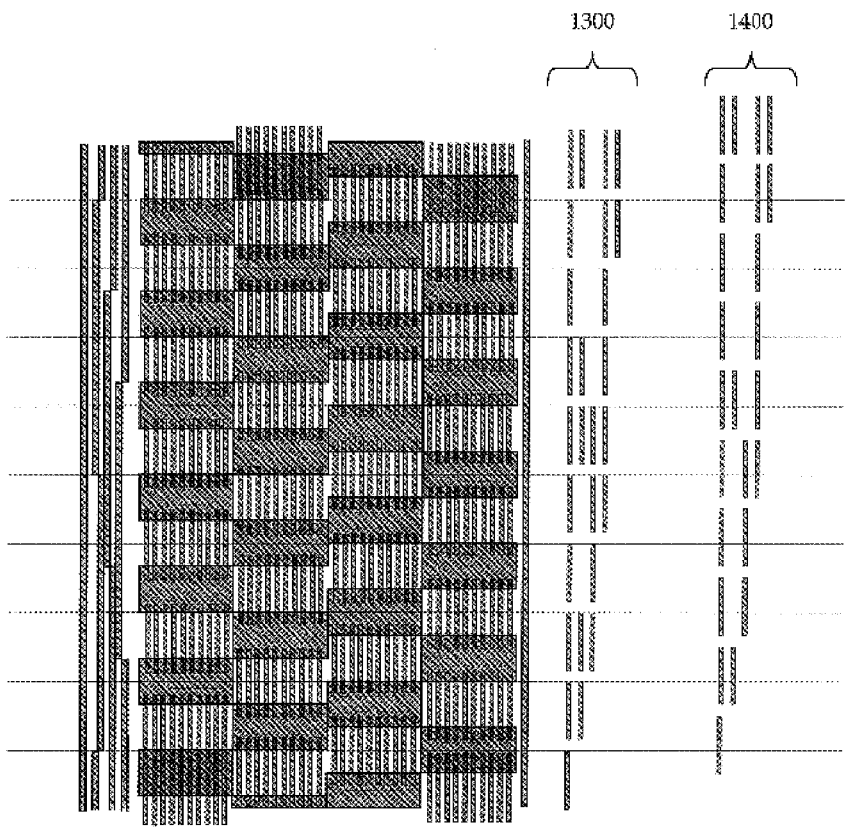

The magnetically written gray code may now be written (FIGS. 12–14). Second patterned servo timing mark 410 is used to signal the start of the magnetically written gray code in this exemplary embodiment. The magnetically written gray code may be written circularly around the rotational center of the disk because the disks will typically be mounted in the disk drive such that the servo pattern is eccentric to the rotational center. The magnetically written gray code can be written at a higher spatial frequency than that of the patterned gray code and thus may be more area efficient.

In this exemplary embodiment, each magnetically written gray code bit is written by pulsing the recording head on the previously erased media. FIG. 12 illustrates the sequence that may be used to write the magnetically written gray code. Bits 1200 correspond to the D PES bursts, bits 1202 correspond to B PES bursts, bits 1204 correspond to C PES bursts, and bits 1206 correspond to A PES bursts. Thus, each burst in the PES burst fields is rotated through when writing the magnetically written gray code. The present invention, however, is not limited to this method. The magnetically written gray code can be written in any desired pattern or sequence.

The magnetically written gray code 1300 may be used to define the track number of the data tracks with no eccentricity (FIG. 13). For example, in this exemplary embodiment, bit 1302 depicts a magnetic sync mark. Magnetically written gray code bit 1304 corresponds to track 1. Bit 1306 corresponds to track 2, while bit 1308 corresponds to track 3. The track numbers increase as the tracks move to the OD of the disk, and the corresponding magnetically written gray code bit defines each track number.

Writing gray code on each logical track however, may create gaps in the gray code bits due to side erasure. Side erasure is depicted in FIG. 13 by gap 1310. One technique for detecting a side erasure gap is to logically AND a particular gray code bit with the next adjacent gray code bit. When a gap is detected, a second magnetically written gray code 1400 may be written (FIG. 14). The first 1300 and second 1400 gray codes may be written as two sets of gray code (even and odd) in order to compensate for side erasure gaps in the first gray code set 1300 created by fringe fields from the write head. The magnetically written gray code bits may then be detected as the logical OR of the sensed signal in the two locations.

Figure 15:
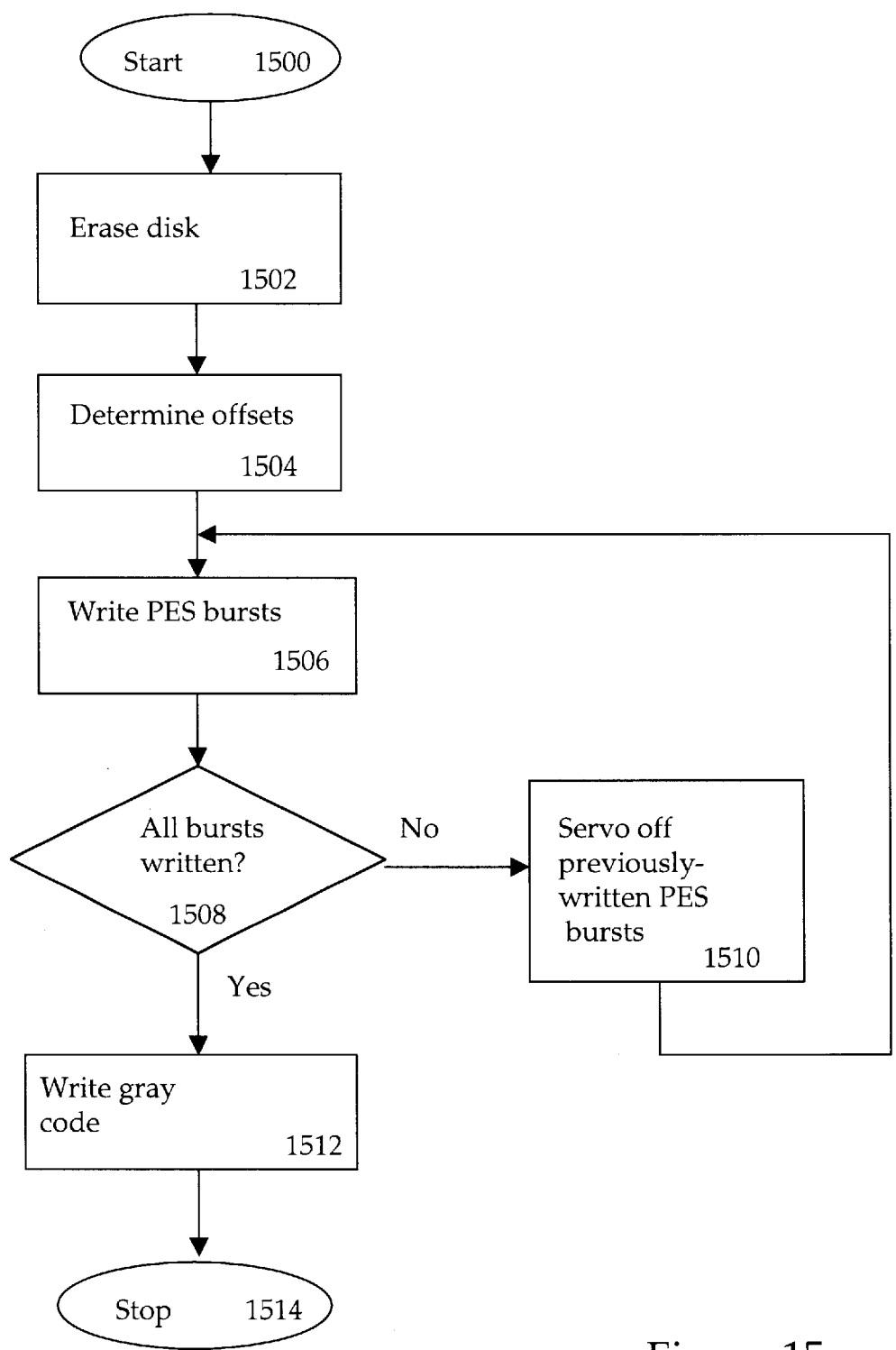
FIG. 15 is a flowchart illustrating an exemplary method for initializing patterned media according to the present invention.

Referring to FIG. 15, a flowchart illustrating an exemplary method for initializing patterned media according to the present invention is shown. The process begins at block 1500, and thereafter passes to block 1502 where the patterned media may be DC initialized. At least one offset may then be determined, as shown in block 1504. The at least one offset may include an offset to compensate for a read to write delay in the electronics and an offset to compensate for a delay caused by the space separation between the read and write heads (e.g. radial and circumferential offsets).

Next, the process of writing PES bursts may begin (block 1506). A determination may then be made at block 1508 as to whether or not all of the PES bursts have been written. If all of the PES bursts have not been written, the previously written PES bursts may be used to determine PES signals (block 1510) to guide the write head as new PES burst fields are written (block 1506). When all of the PES bursts have been written, the process continues at block 1512 where the magnetically written gray code may be written. The process then ends, as shown in block 1514.

Figure 16:
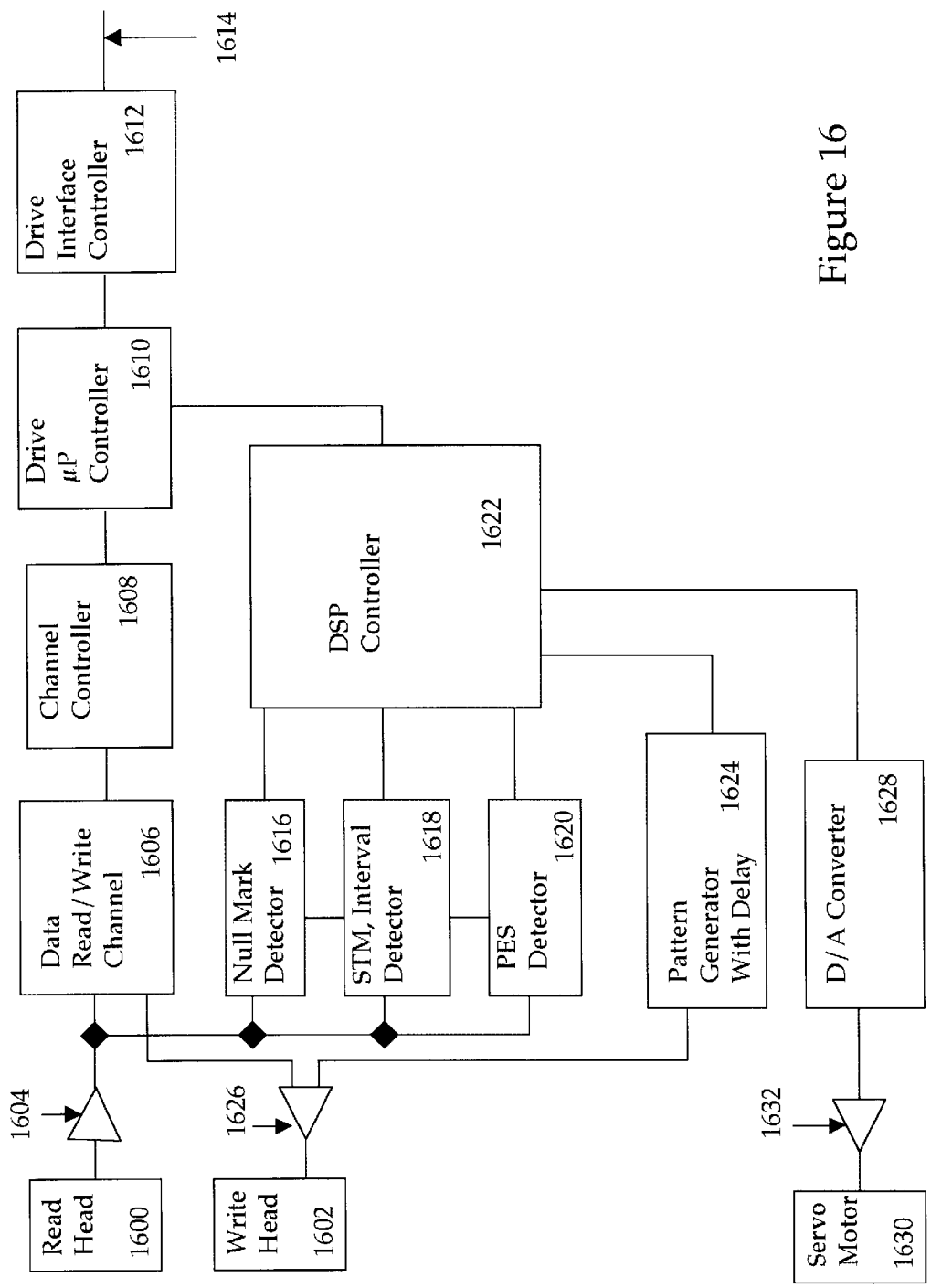
FIG. 16 is a block diagram of an exemplary system that may be used to initialize a patterned media according to the present invention.

FIG. 16 is a block diagram of an exemplary system that may be used to initialize a patterned media according to the present invention. At least one read head 1600 and at least one write head 1602 are included in the system. The read head 1600 may be connected to the input of a buffer 1604. The output of the buffer may be connected to a data read/write channel 1606. The data read/write channel 1606 may be implemented in any desired manner, such as a modulator that performs a partial response, maximum likelihood encoding.

The data read/write channel is connected to a channel controller 1608 that may perform a variety of functions. The channel controller 1608 may perform zone bit recording, determine clock frequencies, and determine splits across servo sectors. The channel controller 1608 is connected to a drive microprocessor controller 1610, which is connected to a drive interface controller 1612. The drive interface controller 1612 may be implemented in any desired manner. One example of a drive interface controller 1612 is a SCSI controller. However, any desired interface controller may be used with the present invention. The drive interface controller 1612 connects to a host computer (not shown) via line 1614.

The output of buffer 1604 may also be connected to a null mark detector 1616, a servo timing mark (STM) and interval detector 1618, and a PES detector 1620. The null mark detector 1616 is used in this exemplary embodiment to detect transitions in the null-type PES pattern. For example, the null mark detector 1616 detects a transition between a DC magnetized A burst and B burst (i.e. Null_N PES) or a transition between a DC magnetized C burst and D burst (Null_Q PES).

The servo timing mark (STM) and interval detector 1618 may be used to determine the offsets, such as an offset to compensate for read to write delay and at least one offset to compensate for delays caused by the space separation between the read and write heads (e.g. radial and circumferential delays). A PES detector 1620 may be used to detect PES bursts. The null mark detector 1616, servo timing mark (STM) and interval detector 1618, and PES detector 1620 may be configured and implemented in any desired manner. For example, the null mark detector 1616, servo timing mark (STM) and interval detector 1618, and PES detector may be implemented as hard wired logic within the system.

The null mark detector 1616, servo timing mark (STM) and interval detector 1618, and PES detector may be connected to a DSP controller 1622, which in turn may be connected to the drive microprocessor controller 1610. A pattern generator with delay 1624 determines a pattern for data, such as the magnetically written gray code. A variable delay may be included in order to compensate for the read to write delay in the electronics and the delay caused by the space separation between the read and write heads. The variable delay allows the write head to be positioned over the proper location when writing to the media. The pattern generator 1624 is connected to the write head 1602 via buffer 1626.

Finally, the DSP controller 1622 may be connected to a digital-to-analog converter 1628. The D/A converter 1628 may supply the analog voltage to a servo motor 1630 via buffer 1632. The present invention, however, is not limited to a system having all of these components. In certain embodiments, the systems may include additional components or may be implemented and configured with fewer components than the components shown in FIG. 16.

While the invention has been particularly shown and described with reference to a preferred embodiment, it will be understood by those skilled in the art that various changes in form and detail may be made therein without departing from the spirit and scope of the invention.

What is claimed is:

1. A method for initializing patterned media, wherein the patterned media includes recordable and non-recordable regions, the method comprising:
   initializing at least a portion of the recordable regions;
   determining at least one offset to compensate for at least one delay; and
   writing data on at least a portion of the initialized recordable regions, wherein at least a portion of the previously written data is used as a guide when writing new data on the at least a portion of the initialized recordable regions.

2. The method of claim 1 further comprising the step of writing a first set of gray code on a portion of the initialized recordable regions after performing the step of writing data on at least a portion of the initialized recordable regions.

3. The method of claim 2 further comprising the step of writing a second set of gray code on a portion of the initialized recordable regions after writing the first set of gray code, wherein the second set of gray code compensates for side erasure gaps in the first set of gray code.

4. The method of claim 1 wherein the step of initializing at least a portion of the recordable regions comprises the step of applying a direct current to a write head and passing the write head over the at least a portion of the recordable regions.

5. The method of claim 2 wherein the step of determining at least one offset to compensate for at least one delay comprises the step of determining a first offset to compensate for a read to write delay.

6. The method of claim 5 wherein the step of determining at least one offset to compensate for at least one delay comprises the step of determining at least one offset to compensate for at least one delay caused by a separation space between the at least one read head and the at least one write head.

7. The method of claim 6 wherein the step of determining at least one offset to compensate for at least one delay comprises:
   writing at least one test mark on at least a portion of the initialized recordable region;
   determining the position of the at least one write head and at least one read head on the patterned media at the time of writing the test mark;
   determining when the at least one read head detects a first edge of the test mark;
   determining the position of the at least one read head on the patterned media at the time of detecting the first edge of the test mark;
   determining when the at least one read head detects a second edge of the test mark;
   determining the position of the at least one read head on the patterned media at the time of detecting the second edge of the test mark; and determining the at least one offset by using at least a portion of the values determined in the previous steps.

8. The method of claim 7 wherein the step of writing data on at least a portion of the initialized recordable regions comprises the step of writing a plurality of position error signal (PES) bursts on the at least a portion of the initialized recordable regions, wherein at least a portion of the previously written PES bursts are used as a guide when writing new PES bursts on the at least a portion of the initialized recordable regions.

9. The method of claim 8 wherein the step of determining the position of the at least one write head on the patterned media at the time of writing the test mark comprises the step of reading at least one PES burst and a first track address.

10. The method of claim 8 wherein the step of determining the position of the at least one read head on the patterned media at the time of detecting the first edge of the test mark comprises the step of reading at least one PES burst and a second track address.

11. The method of claim 10 wherein the step of determining the position of the at least one read head on the patterned media at the time of detecting the second edge of the test mark comprises the step of reading at least one PES burst and a third track address.

12. A system for initializing patterned media for use with a storage system, the system comprising:
   a pattern generator connected to a write read for generating a data pattern on the patterned media;
   a delay circuit connected to the patterned generator for providing at least one time delay when the write head is writing data on the patterned media;
   at least one detector connected to a read head for detecting at least one particular data mark when the read head is reading from the patterned media; and
   an interval detector connected to the read head for determining at least one offset to compensate for at least one delay.

13. The system of claim 12 further comprising:
   a data read/write channel connected to the read head;
   a channel controller connected to the data read/write channel;
   a drive microprocessor controller connected to the channel controller;
   a DSP controller connected between the drive microprocessor controller, the pattern generator, and the at least one detector; and
   a drive interface controller connected to the drive microprocessor controller.

14. The system of claim 12 wherein the data pattern comprises a first set of gray code.

15. The system of claim 12 wherein the data pattern comprises a second set of gray code.

16. The system of claim 12 wherein the delay circuit comprises a variable delay circuit.

17. The system of claim 12 wherein the at least one detector comprises a position error signal detector.

18. The system of claim 17 wherein the position error signal detector comprises a null pattern detector.

19. The system of claim 17 wherein the position error signal detector comprises a quad burst pattern detector.

20. The system of claim 13 wherein the at least one offset comprises at least one offset to compensate for at least one delay caused by a separation space between the read head and the write head.

21. The system of claim 13 wherein the at least one offset comprises at least one offset to compensate for a read to write delay.

* * * * *